United States Patent
Mair et al.

(10) Patent No.: US 9,600,024 B2
(45) Date of Patent: Mar. 21, 2017

(54) CONTROL METHOD OF CLOCK GATING FOR DITHERING IN THE CLOCK SIGNAL TO MITIGATE VOLTAGE TRANSIENTS

(71) Applicant: MediaTek Singapore Pte. Ltd., Singapore (SG)

(72) Inventors: Hugh Thomas Mair, Fairview, TX (US); Gordon Gammie, Plano, TX (US); Alice Wang, Allen, TX (US); Uming Ko, Houston, TX (US)

(73) Assignee: MediaTek Singapore Pte. Ltd., Singapore (SG)

( * ) Notice: Subject to any disclaimer, the term of this patent is extended or adjusted under 35 U.S.C. 154(b) by 183 days.

(21) Appl. No.: 14/037,346

(22) Filed: Sep. 25, 2013

(65) Prior Publication Data

US 2014/0095919 A1    Apr. 3, 2014

Related U.S. Application Data

(60) Provisional application No. 61/707,195, filed on Sep. 28, 2012.

(51) Int. Cl.
| | |
|---|---|
| *G06F 1/32* | (2006.01) |
| *G06F 1/14* | (2006.01) |
| *G06F 1/06* | (2006.01) |
| *G06F 1/26* | (2006.01) |

(52) U.S. Cl.
CPC .............. *G06F 1/14* (2013.01); *G06F 1/06* (2013.01); *G06F 1/26* (2013.01); *G06F 1/324* (2013.01)

(58) Field of Classification Search
CPC ........................................................ G06F 1/14
USPC ......................................................... 713/501
See application file for complete search history.

(56) References Cited

U.S. PATENT DOCUMENTS

| | | | |
|---|---|---|---|
| 7,594,126 B2* | 9/2009 | Yun et al. | 713/300 |
| 7,904,740 B2* | 3/2011 | Nousiainen | G06F 1/3203 |
| | | | 323/271 |
| 2003/0112038 A1 | 6/2003 | Naffziger | |
| 2007/0204186 A1* | 8/2007 | Brown | G06F 1/08 |
| | | | 713/600 |
| 2009/0206889 A1* | 8/2009 | Reohr et al. | 327/113 |
| 2013/0191677 A1* | 7/2013 | Ziesler et al. | 713/500 |

FOREIGN PATENT DOCUMENTS

| | | |
|---|---|---|
| CN | 1637683 A | 7/2005 |
| CN | 102640078 A | 8/2012 |
| WO | 2009040689 A1 | 4/2009 |
| WO | 2012064537 A2 | 5/2012 |

\* cited by examiner

*Primary Examiner* — Thomas Lee
*Assistant Examiner* — Sumil Desai
(74) *Attorney, Agent, or Firm* — Winston Hsu; Scott Margo

(57) ABSTRACT

A control method for a clock signal for a CPU contained in a CMOS circuit includes: when a load current for the CMOS circuit is enabled, generating a first clock signal; in a first period, selectively gating certain cycles of the first clock signal to generate a second clock signal which has a clock rate less than a clock rate of the first clock signal; and in a second period, dithering in the gated cycles to increase the clock rate of the second clock signal to be equal to that of the first clock signal. The second clock signal is continuously input to the CMOS circuit during the first period and the second period.

8 Claims, 3 Drawing Sheets

CONTROL METHOD OF CLOCK GATING FOR DITHERING IN THE CLOCK SIGNAL TO MITIGATE VOLTAGE TRANSIENTS

CROSS REFERENCE TO RELATED APPLICATIONS

This applicant claims the benefit of U.S. Provisional application 61/707,195, which was filed on Sep. 28, 2012, and is incorporated by reference in its entirety.

BACKGROUND

Complementary Metal Oxide Semiconductor (CMOS) technology forms the basis of modern computing systems. The huge popularity of portable electronic devices such as smart phones and tablets means that computing technology is required which can function at moderate power while maintaining low leakage power. To meet this demand, modern CMOS technology uses low operating voltages and comprises transistors with a high operating threshold.

These features, however, mean that the CMOS will be sensitive to even small changes in the supply voltage. Sensing circuits which can detect changes in process temperature and voltage (PVT) and adjust certain parameters of a system accordingly provide one solution to the above problem. These sensing circuits cannot control for power variations due to changes in the clock cycle.

Due to the high power consumption of smart phones and tablets, modern CMOS technology employs aggressive clock gating to try and preserve battery life. When an electronic device is not being used, the clock signals will be turned off, and will only be turned on again when the system is operated by a user or due to internal commands. This aggressive clock gating requires large changes in the current that needs to be drawn from the supply. Load regulation of the power supply will cause the power supply to adapt to these changes in the current. In addition, package network inductance of the system means that any changes in current will induce a change in voltage of the system conductors. All these factors result in a momentary dip in the voltage at the CMOS transistors when clock gating occurs. This can be seen in the form of transients in the power supply when the electronic device is turned on, as the power supply adjusts to provide functional power levels for the electronic device.

In order for the electronic device to be fully operational, this voltage loss needs to be recovered as soon as possible. An analog solution is to provide additional voltage at the transistors to compensate for the voltage loss. This negates the benefits of low operation voltages of the CMOS transistors, however. A digital control method offers a more elegant solution.

SUMMARY

A control method for a clock signal for a CPU contained in a CMOS circuit comprises: when a load current for the CMOS circuit is enabled, generating a first clock signal; in a first period, selectively gating certain cycles of the first clock signal to generate a second clock signal which has a clock rate less than a clock rate of the first clock signal; and in a second period, dithering in the gated cycles to increase the clock rate of the second clock signal to be equal to that of the first clock signal. The second clock signal is continuously input to the CMOS circuit during the first period and the second period.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Figure 1:
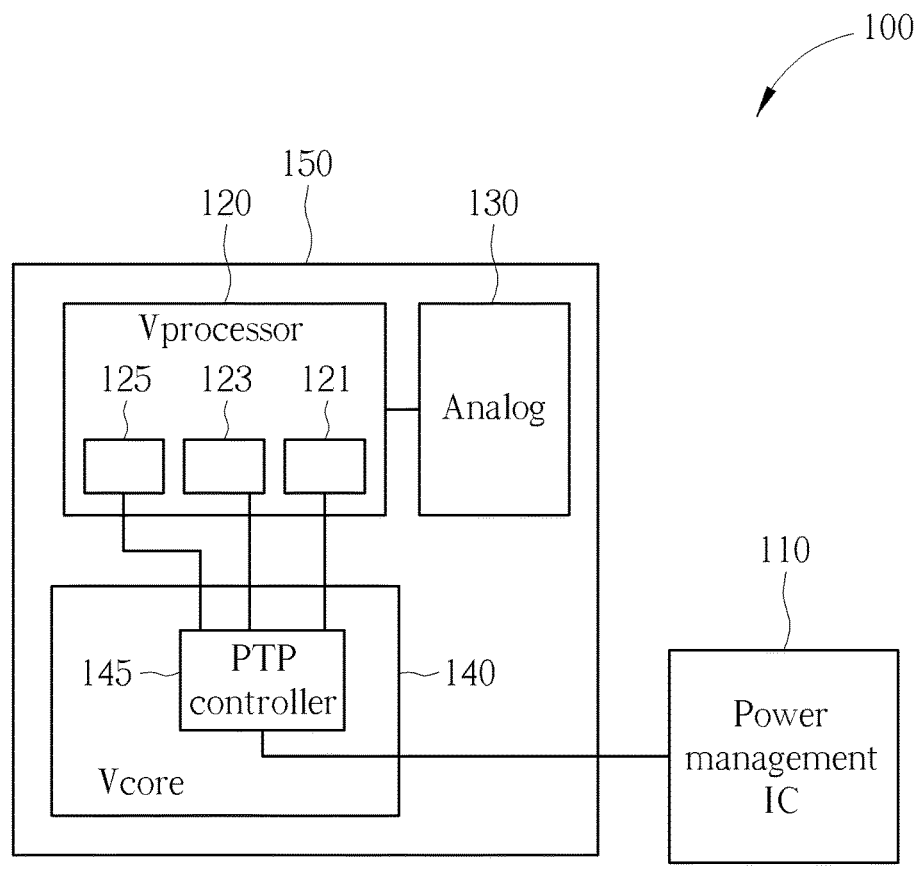
FIG. 1 is a circuit diagram illustrating a PTP system according to an exemplary embodiment of the present invention.

FIG. 1 illustrates a functional diagram of a performance, thermal and power (PTP) management system 100. The PTP system 100 comprises a chip 150 coupled to a Power Management IC circuit 110. This circuit may be on-chip or off-chip. The chip 150 includes an analog circuit 130, a Vprocessor 120 and a Vcore circuit 140. The Vcore comprises a PTP controller 145, which is configured to control the operations of the Vprocessor 120 and analog circuit 130. The Vprocessor 120 comprises a frequency control circuit 121, which is coupled to the analog circuit 130, a sensing module 123, and a clocking sensor 125. The sensing module 123 may include one or multiple types of sensors, such as voltage sensor, temperature sensor, workload sensor or reliability sensor. The chip 150 may be an eFuse, a flash memory, or any of a variety of memory types.

The clocking sensor includes a soft start circuit coupled to the output of a Phase Locked Loop (PLL). As is well known, a PLL is employed in electronic devices for generating a pulsed clock signal. During periods of inactivity of the electronic device, the PLL will be inactive; once the PTP management system 100 receives a user or internal command, the PLL will become operational again for generating a clock signal.

The clock signal generated by the PLL will be input to the soft start circuit. If this clock signal is directly input to the Vcore 140, the resultant large changes in current drawn from the power supply will generate transients in the voltage.

Figure 2:
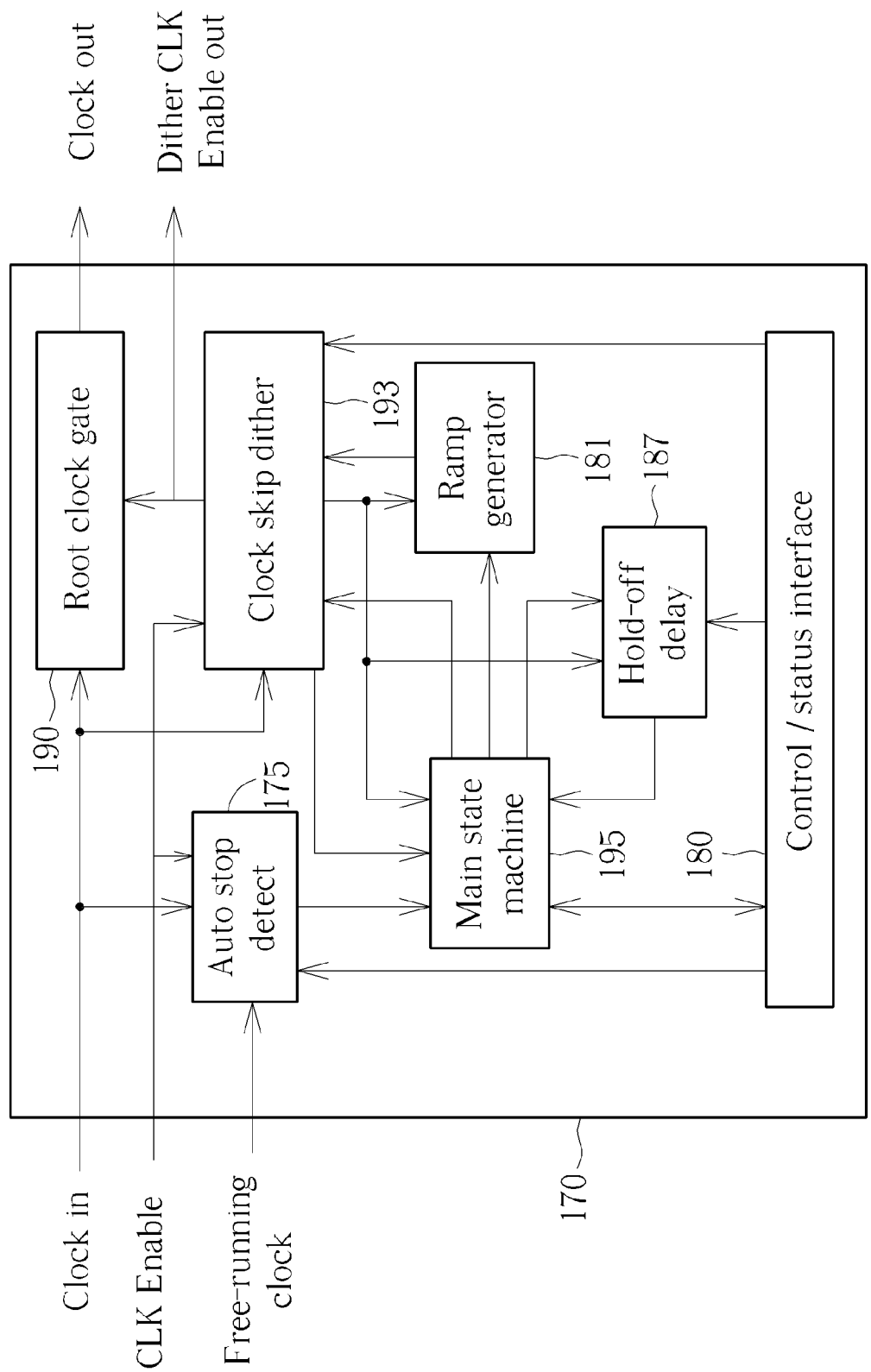
FIG. 2 is a circuit diagram of a soft start circuit of the PTP system illustrated in FIG. 1.

Please refer to FIG. 2, which is a diagram of the soft start circuit 170. As will be detailed in the following, the soft start circuit 170 enables clocks generated by the PLL (not shown) to be selectively gated according to generated enable signals. The soft start circuit 170 comprises a root clock gate circuit 190 for receiving an input clock ('clock in) from the Vcore 140 and providing an output clock signal ('clock out'). The clock in signal is further provided to an auto stop detect circuit 175 and a clock skip dither circuit 193. These two circuits also receive a clock enable signal. The clock skip dither circuit 193 generates a dither clock enable output which is also provided to the root clock gate circuit 190. The clock skip dither circuit 193 is further coupled to a ramp generator 181, a hold-off delay circuit 187 and a main state machine 195. Control signals for these circuits are provided by a control/status interface 180.

As detailed above, transients will be generated if the clock is directly generated by the PLL. The present invention therefore provides a two-stage control method for the clock signal.

In a first stage of the two-stage control method, the soft start circuit 170 selectively gates every other cycle of the clock signal generated by the PLL, so that the clock effectively starts at half speed. Although the transients in the power supply will still occur, this selective gating of the clock means that logic circuits in the electronic device have a setup time which is double that of the prior art. This longer setup time allows for the slower operating speed of the transistors due to transients.

The first stage as detailed above will end once the power transients have settled. In some embodiments, the system can be monitored to determine the load has settled before entering the next stage. In most practical implementations, however, the period of time required for the load to settle is a known amount dependent upon the particular package network, and therefore can be a predetermined time period.

The second stage of the two-stage control method involves dithering in all gated-off clocks until the clock frequency is increased to its full speed. The phase locked loop (PLL) will continue to operate at full speed throughout the process, but the dithering of the clocks allows the effective frequency of the clock signal to be controlled.

Assume a clock signal generated by the PLL has a period of 100 input clocks. The selective gating in the first stage of the two-stage control method means that 50 clocks will be passed through while the other 50 clocks are gated off. In the dithering stage of the two-stage control method, the clock rate will be gradually ramped from its half cycle speed up to 100% without any additional transients being introduced. The gated off clocks will be reduced at a steady rate so that 49 clocks are gated off, then 48 clocks, 47 clocks, etc. The clock signal will not increase to full speed at a rate faster than the power supply can be tracked. In other words, the rate of increase of the effective clock rate is within the bandwidth of the power supply.

At the end of the two-stage control method, the clock will be operating at full speed and the load current will also be at its maximum. These two parameters can then continue to operate at maximum until a next period of inactivity, when the current will be decreased and the clock signal will be gated off.

Figure 3:
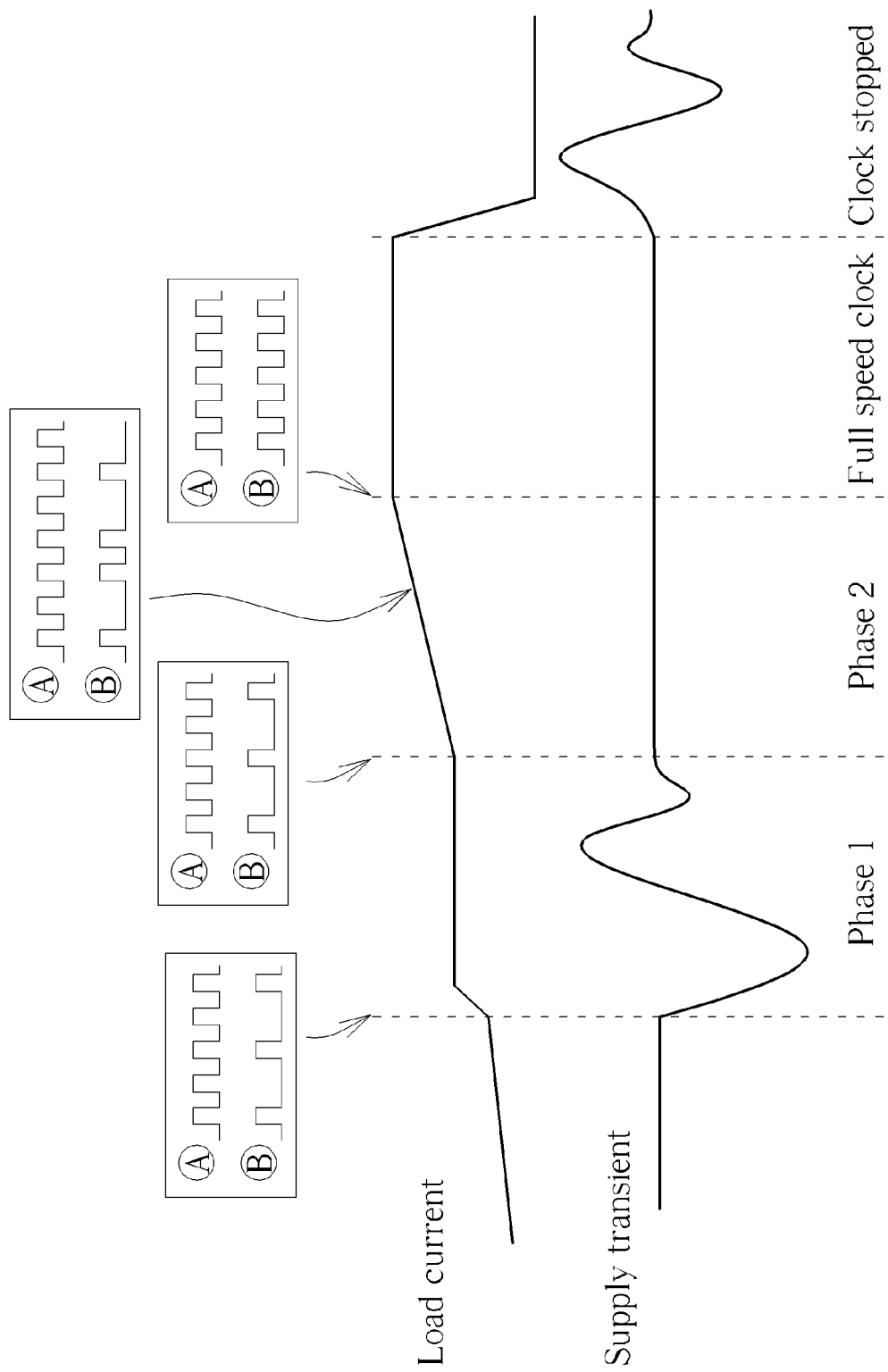
FIG. 3 is a diagram illustrating a clock control method according to an exemplary embodiment of the present invention.

Please refer to FIG. 3, which illustrates the clock ramping technique of the present invention. In the diagram, A represents the clock signal output from the PLL ('clock in' as illustrated in FIG. 2), and B is the clock signal output by the soft start circuit 170 ('clock out' as illustrated in FIG. 2). The diagram also represents the load current for the PTP management system 100 and the supply transients.

In Phase 1 of the diagram (which is the first stage of the two-stage control method), the load current is increased and the clock A is gated such that only half of the input clocks will be output. This half speed clock is maintained for a long enough period to allow any transients to settle. Then, in Phase 2 of the diagram (which is the second stage of the two-stage control method), the clock rate will be slowly ramped to 100% by reducing the gated-off clocks, as shown by the increase in load current. The ramping rate is slow enough to prevent any additional transients from occurring. The time period for this second phase may be a predetermined time or may be programmable. At the end of Phase 2, the clock B is operating at full speed; i.e. no clock gating occurs and clock A is equal to clock B. In the final stage of the diagram, the clock is stopped and the load current is turned off.

It should be noted that the exemplary embodiment of the present invention teaches gating clocks in a first stage so that half of the clocks are gated, but it is possible to selectively gate a greater or lesser percentage of the input clocks. Further, it is also possible to change the time period for each stage of the two-stage input method. The above examples are merely a preferred embodiment of the present invention.

The two-stage control method of the present invention enhances the performance of the CMOS by eliminating any negative effects due to the introduction of transients when a power supply is turned on. Selective gating of input clocks in a first stage increases a time period for logic to operate, thus allowing for slower transistors. Dithering of the selectively gated clocks in a second stage allows the clock rate to be increased to 100% without the introduction of additional transients.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a clock signal for a CPU contained in a CMOS circuit, the method comprising:
   when a load current for operating the CMOS circuit is enabled, generating a first clock signal correspondingly;
   in a first time period beginning from when the load current for the CMOS circuit is enabled, selectively gating cycles of the first clock signal to generate a second clock signal at a steady frequency until transients in the second clock signal have settled, wherein the second clock signal has a clock rate less than a clock rate of the first clock signal; and
   in a second time period, dithering in the gated cycles to increase the clock rate of the second clock signal to be equal to that of the first clock signal;
   wherein the second clock signal is continuously input to the CMOS circuit during the first time period and the second time period.

2. The control method of claim 1, wherein every other cycle of the first clock signal is gated off during the first period so that the second clock signal has a clock rate which is half that of the first clock signal.

3. The control method of claim 1, wherein a length of time of the first period is a predetermined time according to the CMOS circuit.

4. The control method of claim 1, wherein the step of dithering in the gated cycles comprises:
   gradually reducing the number of gated cycles at a steady rate until no cycles are gated off;
   wherein the steady rate is a rate within a bandwidth of a power supply of the CMOS circuit.

5. The control method of claim 1, wherein the first clock signal is generated by a Phase Locked Loop (PLL).

6. A clock control system for a CPU contained in a CMOS circuit, comprising:
  a soft start circuit, comprising:
    a root clock gate circuit, for receiving a first clock signal when a load current for operating the CMOS circuit is enabled, and selectively gating cycles of the first clock signal in a first time period to generate a second clock signal at a steady frequency until transients in the second clock signal have settled, wherein the first time period begins from when the load current is enabled, and the second clock signal has a clock rate less than a clock rate of the first clock signal; and
    a clock skip dither circuit, coupled to the root clock gate circuit, for receiving the first clock signal and a clock enable signal, and dithering in the gated cycles in a second time period to increase the clock rate of the second clock signal to be equal to that of the first clock signal;
  wherein the second clock signal is continuously input to the CMOS circuit during the first time period and the second time period.

7. The clock control system of claim 6, wherein the soft start circuit further comprises:
  an auto stop detect circuit clocked by a free running clock, for receiving the first clock signal and the clock enable signal, and generating an auto stop detect signal;
  a main state machine, coupled to the auto stop detect circuit, for receiving the auto stop detect signal and generating a main state signal; and
  a ramp generator coupled to the main state machine, for receiving the main state signal and generating a ramp signal to the clock skip dither circuit for instructing the clock skip dither circuit to dither in the gated cycles.

8. The clock control system of claim 7, further comprising:
  a hold-off delay circuit coupled to the main state machine, for providing a feedback signal to the main state machine; and
  a control status interface circuit, for providing control signals to the hold-off delay circuit, the main state machine and the clock skip dither circuit.

* * * * *